United States Patent [19]

Stemmler

[11] Patent Number: 4,951,187
[45] Date of Patent: Aug. 21, 1990

[54] METHOD FOR CONTROLLING A THREE-PHASE INVERTER

[75] Inventor: Herbert Stemmler, Kirchdorf, Switzerland

[73] Assignee: Asea Brown Boveri Ltd., Baden, Switzerland

[21] Appl. No.: 440,360

[22] Filed: Nov. 22, 1989

[30] Foreign Application Priority Data

Dec. 14, 1988 [CH] Switzerland ............... 4617/88

[51] Int. Cl.⁵ .................................. H02M 7/527
[52] U.S. Cl. ............................. 363/96; 363/41; 363/71; 363/137; 318/811
[58] Field of Search ............. 307/82; 363/71, 72, 363/95, 96, 98, 132, 135, 136, 137, 138, 40, 41, 42; 318/807–811

[56] References Cited

U.S. PATENT DOCUMENTS

| 3,346,794 | 10/1967 | Stemmler | 318/810 |
| 3,970,916 | 8/1976 | Kienscherf | 363/71 |
| 4,367,522 | 1/1983 | Forstbauer et al. | 363/96 |
| 4,673,859 | 6/1987 | Shero et al. | 318/810 |
| 4,802,079 | 1/1989 | Mizoguchi | 363/71 |

FOREIGN PATENT DOCUMENTS

| 2937995 | 4/1980 | Fed. Rep. of Germany . |
| 420365 | 3/1967 | Switzerland . |
| 489945 | 6/1970 | Switzerland . |
| 1108571 | 4/1968 | United Kingdom . |

OTHER PUBLICATIONS

"Geregelter Drehstrom–Umkehrantrieb mit gesteuertem Umrichter nach dem Unterschwingungsverfahren", BBC–Nachrichten, Dec. 1964.
"Control in Power Electronics and Electrical Drives, IFAG Symposium", Oct. 1974.
"Grundlagen fur die Entwicklung eines Steuerverfahrens fur GTO-Dreipunktwechsel–richter fur Traktionsantriebe", Steinke, etzArchiv Bd. 10, Aug. 1988, pp. 215 to 220.

*Primary Examiner*—William H. Beha, Jr.
*Assistant Examiner*—Jeffrey Sterrett
*Attorney, Agent, or Firm*—Burns, Doane, Swecker & Mathis

[57] ABSTRACT

Inverters (5.1, 5.2) for feeding a three-phase load such as, for example, an asynchronous machine (6), are controlled by pulse width modulation, in such a manner that they supply output voltages ($U_{5.1R}$, $U_{5.2R}$) which are as closely sinusoidal as possible, having few harmonics per alternating-current phase (R, S, T). To achieve the pulse width modulation, a first auxiliary alternating voltage ($U_{H1}$) of a sawtooth generator (1.1), on the one hand, and a second auxiliary alternating voltage ($U_{H2}$) of a sawtooth generator (1.2), which is phase-shifted by 180° with respect to the first one, on the other hand, is superimposed by a control signal transmitter (2) on a sinusoidal first superimposition alternating voltage ($U_{StR}$, $U_{StS}$, $U_{StT}$) with the required frequency and phase angle in logic circuits (3.1, 3.2). Separate inverter groups (5.1, 5.2), the outputs of which are connected via a reactor coil (7), the center tab of which is connected to a stator winding ($W_R$) of the asynchronous machine (6), are controlled in dependence on intersectons of the two superimposition voltages in each case. To reduce the turn-on and turn-off losses, the thyristors (T1, T1'; T2, T2') of the inverter are only switched over at intersections of the rising portion of the auxiliary alternating voltage ($U_{H1}$, $U_{H2}$). During this process, the inverter sections of the two phases (R, S, T), the firsat superimposition alternating voltage of which has been intersected are in each case switched at two successive intersectons while the inverter sections of the adjacent phases are switched over at the subsequent third intersecton. This allows the switching actions to be reduced by ⅓.

10 Claims, 2 Drawing Sheets

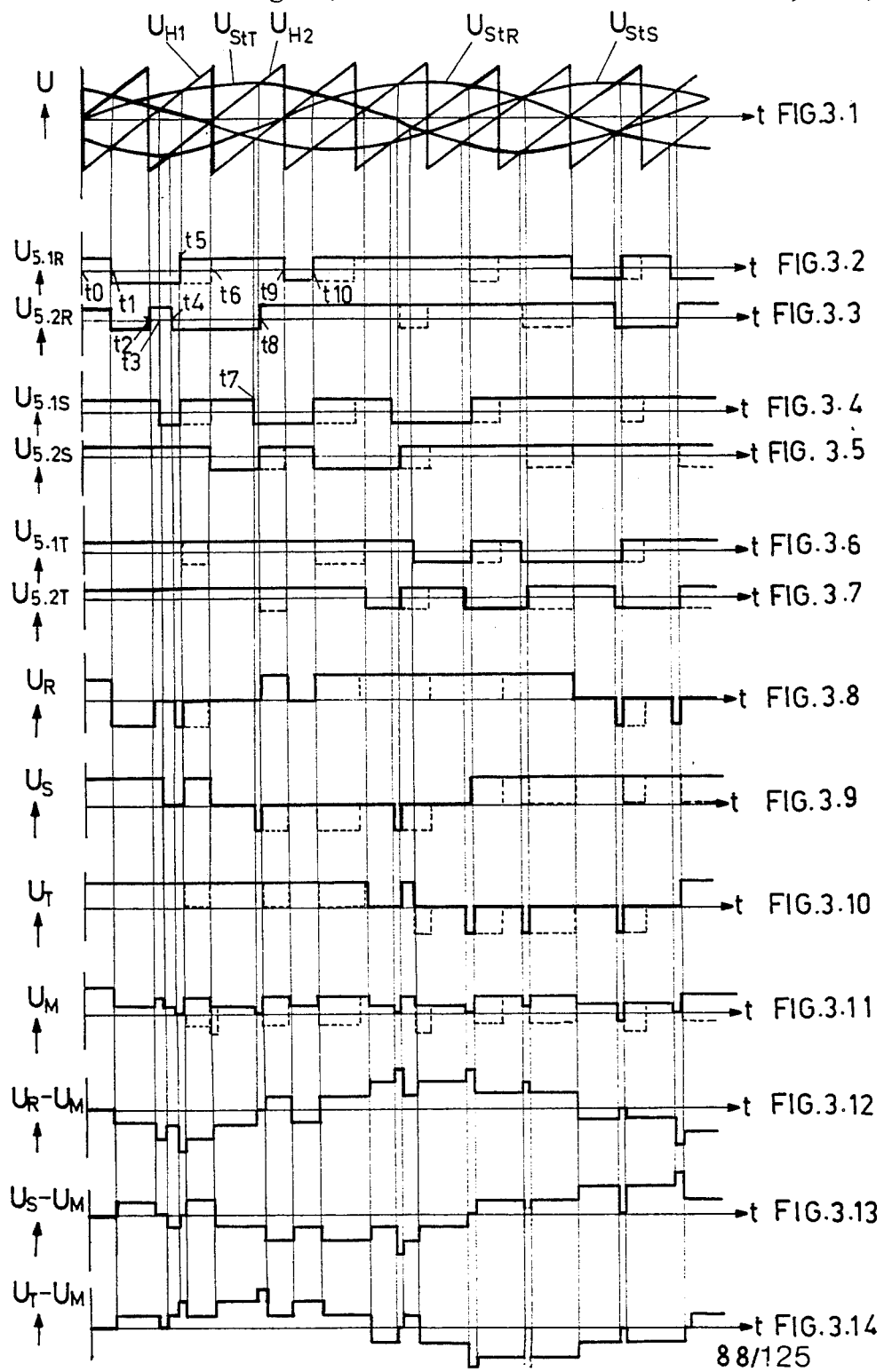

METHOD FOR CONTROLLING A THREE-PHASE INVERTER

BACKGROUND OF THE INVENTION

1. Field of the Invention

The invention is based on a method for controlling a three-phase inverter in accordance with the preamble of claim 1.

2. Discussion of Background

The preamble of the invention relates to a prior art which is known from CH-A-420.365. In this document, several inverter groups are connected in parallel on the alternating-current side via one or more reactor coils for reducing the harmonic content in each phase in a three-phase inverter circuit for feeding a converter-fed motor, in which sinusoidal alternating voltages corresponding to the required frequency and having a high harmonic content are generated from direct-voltage components of different polarity. One motor winding each is connected to the center of one reactor coil. For controlling the inverter, a sinusoidal voltage of the required motor frequency is superimposed on a triangular voltage of higher frequency than the maximum motor frequency, the triangular voltage having different phase angles of 0° and 180°, possibly also of 90° and 270°, for the inverter groups connected in parallel on the alternating-current side. The inverter groups of each phase can be connected in series, reactor coils having one winding each for two inverter groups being provided with common iron core. Inverters of different phases can be coupled to one another via reactor coils. Two inverter groups each can be connected to one primary winding each of transformers, the secondary windings of which are connected in series and are connected to an inverter busbar.

With respect to the relevant prior art, reference is furthermore made to CH-A-489,945 in which a similar inverter control method for feeding a variable-speed asynchronous machine is specified.

With each switch-over of the inverter, turn-on and turn-off losses are produced in the converter valves and their damping elements, which must be removed as heat from the semiconductor valves by means of cooling devices. The efficiency of the inverter decreases with increasing inverter switching frequency and the thermal loading of the semiconductor element rises. For these reasons, it is desirable to be able to manage with as low a relative switching frequency as possible. A three-point circuit is known from DE-A1 29 37 995.

From the German journal etz Archiv. Vol. 10 (1988), No. 7, pages 215–220, it is known that the thyristors of a 3-point inverter are 2 converter sections in concept which are in each case operated as 2-point inverters.

From: Control in Power Electronics and Drives, IFAC SYMPOSIUM, Düsseldorf, Oct. 7–9, 1974, Preprints Volume 1, pages 457–472, it is known that in the 2-pulse control method, the unilaterally sinusoidal pulse width modulation has the most advantageous ratio between harmonics in the current and pulse frequency of the inverter in the lower speed range.

SUMMARY OF THE INVENTION

Accordingly, one object of this invention is to provide a novel method for reducing the turn-on and turn-off losses of an inverter.

One advantage of the invention consists in the fact that the energy consumption during the operation of inverters can be reduced. The power of given semiconductor valves can be better utilized. The expenditure for cooling the semiconductor valves is lower. With the same conventional cooling device, the inverter can be operated at higher-frequency output voltages. A reduction of the transitions of the inverter to $\frac{2}{3}$ can be achieved, particularly in the lower frequency or speed range (0%–50%).

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
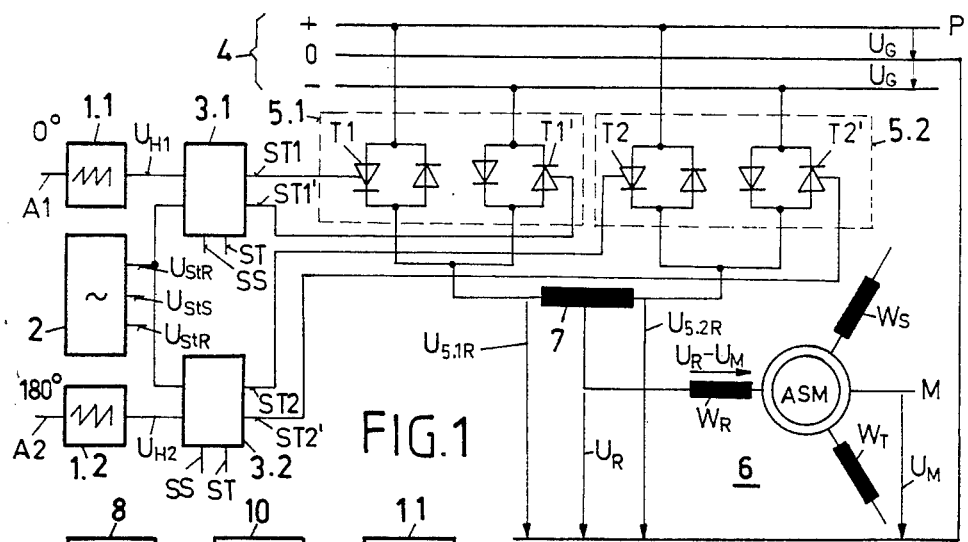
FIG. 1 shows a control circuit for a two-pulse inverter for feeding a three-phase asynchronous machine, which inverter is composed of 2 2-point inverters.

Referring now to the drawings, wherein like reference numerals designate identical or corresponding parts throughout the several views, in the control circuit shown in FIG. 1, two inverter groups 5.1 and 5.2, which are arranged in parallel and are of identical construction, of an inverter section, belonging to phase R, of a three-phase inverter arrangement are connected at the direct-voltage side to a positive pole P and to a negative pole N of a direct-current source with neutral conductor 0 and are connected together on the alternating-voltage side via a reactor coil 7 which acts similar to a balance coil in rectifier arrangement. The direct-current source 4 with a direct voltage of $2 \cdot U_G$ can be a direct-current power system or a direct-current link circuit of a direct-current converter.

The center of the reactor coil 7 is connected to a stator winding $W_R$ of a three-phase asynchronous machine 6 across which a stator winding voltage $U_R$-$U_M$ is dropped when current is flowing. R, S and T designate the three phases of the asynchronous machine 6, all three stator windings $W_R$, $W_S$, $W_T$ of which are drawn. $U_R$ designates a resultant inverter voltage with respect to the neutral conductor 0 with reference to phase R and $U_M$ of a neutral voltage of a neutral point M of the stator windings $W_R$, $W_S$ and $W_T$. Only the inverter section belonging to phase R of the inverter arrangement is shown in greater detail. The remaining stator windings $W_S$ and $W_T$ must be connected to the direct-voltage source 4 in accordance with the stator winding $W_R$. The inverter groups 5.1 and 5.2 exhibit thyristors T1 and T2, the anodes of which are connected to the positive pole P, and thyristors T1′ and T2′, the cathodes of which are connected to the negative pole N, in each case with diodes which are connected in antiparallel with the thyristors. On the alternating-voltage side, the thyristors T1 and T1′ and T2 and T2′ are electrically connected and are connected to opposite ends of the reactor coil 7. $U_{5.1R}$ and $U_{5.2R}$ designate the output voltages of the inverter groups 5.1 and 5.2 of the inverter section with respect to the neutral conductor 0 with reference to phase R.

Figure 2:
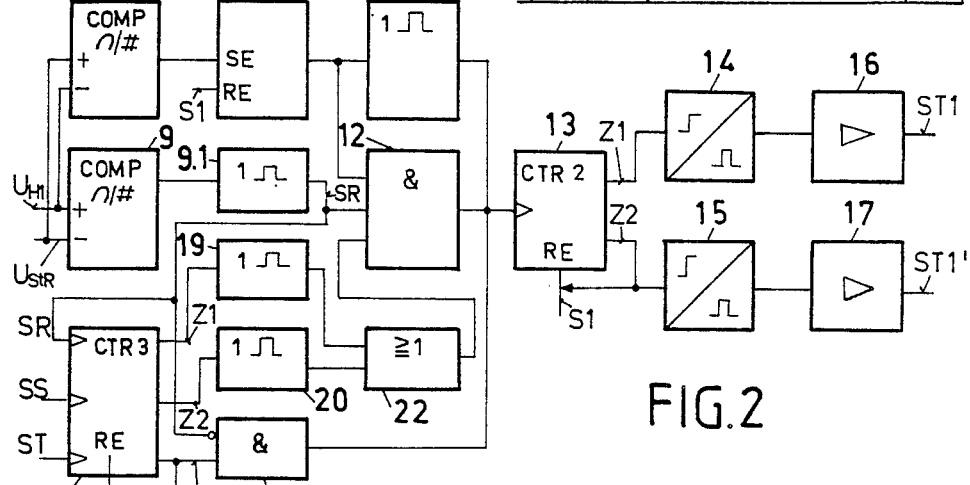
FIG. 2 shows a logic circuit of the control circuit according to FIG. 1, FIGS. 3.1–3.14 show signal diagrams for explaining the effect of the control circuit according to FIG. 1.

The inverter groups 5.1 and 5.2 are controlled via logic circuits 3.1 and 3.2 of identical construction, one of which is shown in greater detail in FIG. 2. In the logic circuits, a sinusoidal control voltage $U_{StR}$, which is supplied by a control signal transmitter 2, is compared with a triangular auxiliary alternating voltage $U_{H1}$ and $U_{H2}$ which are supplied by sawtooth generators 1.1 and 1.2. The control signal transmitter 2 can be, for example, a speed controller, known per se, with secondary current controller which sets the speed for the asynchronous machine 6. $U_{StS}$ and $U_{StT}$ designate control voltages with reference to phases S and T which exhibit the same amplitude as the control voltage $U_{StR}$ for phase R but a phase shift by 120° electrical and 240° electrical, respectively, with respect to this phase. The frequency of these control voltages corresponds to the required frequency of the asynchronous machine 6. The auxiliary alternating voltages $U_{H1}$ and $U_{H2}$ are equal in their predeterminable amplitude and frequency but mutually phase-shifted by 180° electrical; their frequency is higher than the maximum frequency of the asynchronous machine 6.

The inputs of the sawtooth generators 1.1 and 1.2 are supplied with possibly different sawtooth-shaped signals A1 and A2 which determine the shape of the auxiliary alternating voltages $U_{H1}$ and $U_{H2}$ in dependence on the mean value of the current in the neutral conductor 0 and/or in dependence on the mean value of the neutralpoint voltage $U_M$. The sawtooth-shaped signals A1 and/or A2 can be altered during operation in order to balance out any displacements in potential of the neutral-point voltage $U_M$ with respect to the neutral conductor 0. If the sawtooth-shaped signals A1 and A2 exhibit a predeterminable first potential, the auxiliary alternating voltages $U_{H1}$ and $U_{H2}$ have the shape shown in FIG. 3.1. If A1 and A2 exhibit a predeterminable second potential, $U_{H1}$ and $U_{H2}$ are inverted with steep rising and flat falling edges (not shown).

The harmonic content of the rectangular alternating voltage applied to the stator windings $W_R$, $W_S$, $W_T$ of the asynchronous machine 6 can be considerably reduced in familiar manner (FIG. 3 of CH-A-420,365) by means of the 180° phase shift.

In the logic circuit 3.1 according to FIG. 1, shown in FIG. 2, 8 and 9 designate comparators, the inputs of which are supplied, however with opposite polarity, with the sinusoidal control voltage and the first superimposition voltage $U_{StR}$ and the auxiliary alternating voltage or second superimposition voltage $U_{H1}$. The output of the comparator 8 is connected to the set input SE of an SR flip flop 10 which can be reset to a logical 0 at the output by a predeterminable preset signal S1 applied to the reset input RE. At the output, the SR flip flop 10 is connected via a non-retriggerable flip flop 11 to a trigger input of a counter 13 which exhibits counting outputs Z1 and Z2 and can also be reset to 0 by the reset signal S1 applied to the reset input RE. The counting outputs Z1 and Z2 alternately exhibit the 1 state when a 0-1 transition occurs at the counting input. A 1 state at the counting output Z2 resets the counter 13 to 0 via the reset input RE.

The counting outputs Z1 and Z2 are connected via trigger pulse generators 14 and 15 to trigger pulse amplifiers 16 and 17 at the outputs of which the trigger signals ST1 and ST1' for thyristors T1 and T' are present. Approximately 100 μs before the trigger signal for the thyristor T1, the trigger pulse generator 14 generates a turn-off signal for the thyristor T1' if the latter is conducting. Correspondingly, approximately 100 μs before the trigger signal for the thyristor T1', the trigger generator 15 generates a turn-off signal for the thyristor T1 if the latter is conducting. The turnoff signals and turn-off signal circuits are not shown for reasons of better clarity.

The output of the comparator 9, at the negating input of which the control voltage $U_{StR}$ is present and at the non-negating input of which the auxiliary alternating voltage $U_{H1}$ is present, is connected via a monostable flip flop 9.1, at the output of which a switch-over signal SR with reference to phase R is present, and via an AND gate 12 to the counting input of the counter 13. The switchover signal SR=1 for a predeterminable operating time for $U_{H1} \geq U_{StR}$ and otherwise it is =0. The switch-over signal SR and similar switch-over signals SS and ST which are supplied by logic circuits which belong to phases S and T are supplied to counting inputs of a counter 18 having three counting outputs Z1–Z3 and a reset input RE. The counting outputs Z1, Z2, Z3 successively exhibit the 1 state when 0-1 transitions occur at the counting inputs. A reset signal S1 and/or a 1 state at the counting output Z3 resets the counter 18 to 0 via the reset input RE.

Counting outputs Z1 and Z2 are connected via nonretriggerable monostable flip flops 19 and 20 and a subsequent OR gate 22 to one input of the AND gate 12. A further input of the AND gate 12 is connected to the output of the SR flip flop 10. The counting output Z3 is connected via an AND gate 21 to the counting input of the counter 13. A negated input of the AND gate 21 is connected to the output of the flip flop 9.1. The operating time of the flip flops 9.1, 11, 19 and 20 is set to be of such a short time that their output signal is 0 before an intersection of the auxiliary alternating voltage $U_{H1}$ with a control voltage $U_{StS}$ or $U_{StT}$ of an adjacent phase S and T, respectively, can be reached.

The effect of the circuits shown in FIGS. 1 and 2 will now be explained with reference to FIGS. 3.1–3.14. FIG. 3.1 shows sinusoidal control voltages $U_{StR}$, $U_{StS}$ and $U_{StT}$, which are phase-shifted by 180° electrical, for controlling the phases R, S, T and alternating voltages $U_{H1}$ and $U_{H2}$, which are phase-shifted by 180° electrical relative to one another, as a function of time t. The voltage U is plotted along the ordinate. The amplitudes of the alternating voltages $U_{H1}$ and $U_{H2}$ are greater than the amplitudes of the control voltages $U_{StR}$, $U_{StS}$, $U_{StT}$, which are mutually identical.

In FIGS. 3.2–3.7, the rectangular output voltages $U_{5.1R}$, $U_{T.2R}$; $U_{5.1SA}$, $U_{5.2S}$; $U_{5.1T}$, $U_{5.2T}$ of inverter groups 5.1 and 5.2 with respect to the zero conductor 0 with reference to phases R, S, T are shown as a function of time t. Transitions which would occur with conventional control without the measure according to the invention are shown dashed.

At the beginning of the control process, the SR flip flop 10 and the counters 13 and 18 are reset by the reset signal S1 so that their output signals are a logical 0. At a time t0, the vertically falling auxiliary voltage $U_{H1}$ intersects the control voltages $U_{StR}$, $U_{StS}$ and $U_{StT}$ so that the output signal of the comparators 8 of the three phases R, S, T changes from the 0 to the 1 state. This value is stored in the respective SR flip flop 10, the output signal of which also changes from 0 to the 1 state. This state change results, via flip flop 11, in a counting pulse in the counter 13, the signal output Z1 of which changes from 0 to 1; . As a result, a trigger pulse is generated in the trigger pulse generator 14 which is amplified in the trigger pulse amplifier 16 and triggers the thyristor T1. As a result, positive potential $U_G$ is present across the reactor coil 7 and across the stator winding $W_R$. The same applies to phases S and T, cf. output voltages $U_{5.1S}$ and $U_{5.1T}$.

At time t1, the rising auxiliary alternating voltage $U_{H1}$ intersects the control voltage $U_{StR}$, with the effect that the associated inverter 5.1 switches from +to −at the output. This occurs due to the fact that the output signal of the comparator 9 changes from 0 to 1. Due to this 0-1 change, the switch-over signal SR, and thus also the counting output Z1 of the counter 18, becomes a logical 1 during the operating time of flip flop 9.1. Via the flip flop 19 and the OR gate 22, the associated input of the AND gate 12, which is enabled with the stored value 1 via the SR flip flop 10 also becomes a logical 1. This provides the counter 13 with a counting signal so that, instead of Z1, Z2 now assumes the logical value 1. As a result, the trigger pulse generator 15 generates a trigger pulse for the thyristor T1', the thyristor T1 being turned off at the same time (turn-off device not shown). The potential $U_{5.1R} = -U_G$ is now present across the reactor coil 7.

At time t3, the rising auxiliary alternating voltage $U_{H1}$ intersects the control voltage $U_{StS}$, with the effect that the associated inverter 5.1 switches from +to −. This occurs as a result of the fact that the switch-over signal SS becomes 1, and the output voltage $U_{5.1S}$ becomes $-U_G$ in the logic circuit 3.1 belonging to phase S. In the logic circuit 3.1 belonging to phase R, the counter 18 also receives a counting pulse so that, instead of Z1, Z2 now becomes 1. However, this 1 signal cannot pass through the AND gate 12 since SR =0.

At time t5, the rising auxiliary alternating voltage $U_{H1}$ intersects the control voltage $U_{StT}$, with the effect that the inverter 5.1 of phase T does not now switch from + to − (as would be the case in the known arrangement), but its two adjacent inverters 5.1 and 5.2 of phases R and S each switch from − to +. This occurs due to the fact that in all three logic circuits 3.1 belonging to phases R, S, T, the counter 18 receives a counting pulse so that, instead of Z1 and Z2, Z3 now becomes 1. The output signal of the OR gate 22 is thus =0 and the AND gate 12 disabled. In the logic circuit 3.1 belonging to phase T, the AND gate 21 is disabled because of ST =1 whereas it is enabled because of SR =0 and SS =0 in the other two phases R and S. In these two phases, a counting pulse passes via the AND gate 21 to the counter 13 so that the latter switches to Z1=1 after previous resetting. Thus, $U_{5.1R}$ becomes $U_G$ and $U_{5.1S}$ becomes $U_G$.

At time t6, the voltage of $U_{H1}$ drops again as at time t0. However, the intersections with the control voltages $U_{StR}$, $U_{StS}$, $U_{StT}$ do not have any effect whatever, that is to say none of the three inverters 5.1 of phases R, S, T switches, since the output state of the SR flip flop 10 remains unchanged once it has been set.

The switching sequence specified is now repeated. At times t7, t9 and t10, the rising auxiliary alternating voltage $U_{H1}$ successively intersects control voltages $U_{StS}$, $U_{StR}$, $U_{StT}$, a valve switching occuring at phases S and R but not at T. Instead of a transition at T, the transitions at phases S and R are effected as explained above in conjunction with the switch-over times t1, t3 and t5.

With respect to inverter groups 5.2 of the three phases R, S, T, the same applies as for inverter groups 5.1, except that the second superimposition or auxiliary alternating voltage $U_{H2}$ is superimposed on the first superimposition voltages $U_{StR}$, $U_{StS}$, $U_{StT}$. At time t0, only $U_{StS} > U_{H2}$ so that the counter 13 of the logic circuit 3.2 of phase S receives a counting pulse via components 8, 10, 11. As a result, Z1 becomes 1 at counter 13 and the associated thyristor T1 receives a trigger pulse via components 14 and 16, with the effect that $U_{5.2S}$ exhibits positive potential, compare FIG. 3.5. At phases R and S, the 1st thyristor triggering occurs at time t2 when $U_{StR}$ and $U_{StT}$ become $>U_{H2}$. Before that, the 0 output of the respective SR flip flop 10 blocks the AND gate 12. In this connection, the output voltages $U_{5.2R}$ and $U_{5.2T}$ of the inverter groups 5.2 are also set to the same positive potential $U_G$ at time t2, cf. FIG. 3.3 and FIG. 3.7.

In FIGS. 3.8–3.10, the resultant inverter output voltages with respect to the zero conductor 0, namely $U_R$, $U_S$ and $U_T$, are shown as a function of time t, where: $U_R = U_{5.1R} + U_{5.2R}$, $U_S = U_{5.1S} + U_{5.2S}$ and $U_T = U_{5.1T} + U_{5.2T}$.

FIG. 3.11 shows the neutral-point voltage $U_M = U_R + U_S + U_T$ of the common neutral point M of the stator windings $W_R$, $W_S$, $W_T$ with respect to the neutral conductor 0 of the direct-current source 4 as a function of time t.

In FIGS. 3.12 - 3.14, winding voltages $U_R - U_M$ and $U_S - U_M$ and $U_T - U_M$ are shown as a function of time t. The same voltage conditions effected with 10 transitions according to the invention would have required 16 transitions in the conventional control method.

Figure 4:
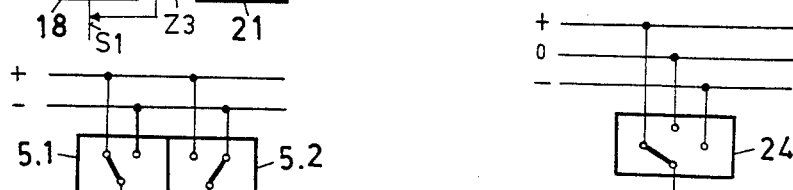
FIG. 4 shows a two-pulse 2×2-point inverter with reactor of the same phase and FIG. 5 shows a two-pulse three-point inverter for feeding an asynchronous machine.
Figure 5:
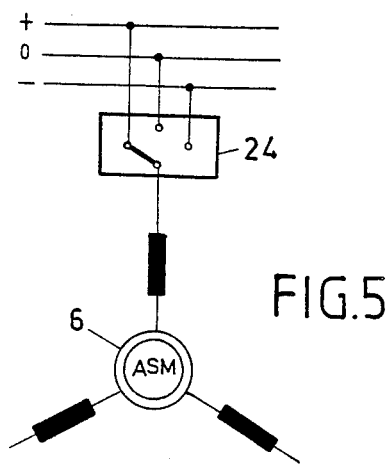

FIGS. 4 and 5 show two different inverter circuits in which the 2-pulse control system can be implemented. In the 2×2-point circuit shown in FIG. 4, with reactor coil 23 of the same phase, there are no problems with the switching sequence dead time of the inverter. The 3-point circuit according to FIG. 5 has the advantage that it manages without reactor coil. In FIGS. 4 and 5, the inverters are shown simplified as switches.

The method according to the invention can also be used in a single-pulse 2-point inverter which would result from the circuit according to FIG. 1 without signal generator 1.2, logic circuit 3.2, inverter group 5.2 and reactor coil 7, in which arrangement the stator winding $W_R$ would be connected directly to the output of the inverter group 5.1.

The invention is based on the finding that 3 synchronous transitions from + to − or from − to + do not have any effect on the winding voltage and that switching in an adjacent phase, for example S or T, has half the negative effect on the winding voltage as in a phase considered, for example R. Instead of switching the phase R from positive potential to negative potential, the two adjacent phases S and T can be switched from negative potential to positive potential. Applying these principles, unnecessary transitions can be avoided. This applies, at least, when the load impedances are identical in the three phases. The load can also be a transformer or a three-phase power system.

The switch-over times and the sequence of phases are selected in such a manner that a three-phase, possibly sinusoidal motor winding voltage or load phase voltage is produced. In this arrangement, the switch-over times of one pulse are offset with respect to those of the other one in such a manner that when the voltages of the two pulses are added, as many harmonics as possible are again cancelled out against one another. A further reduction in harmonics can be achieved, for example, if four differently controlled inverter groups per phase are connected together, the phase shift of the auxiliary alternating voltage being 90° in each case. Reference is made to the CH-A-420,365 initially mentioned with respect to circuits for reducing harmonics.

With a relatively high pulse frequency of the auxiliary alternating voltages $U_{H1}$ and $U_{H2}$, the method according to the invention can be used within the entire speed range of the asynchronous machine 6. Preferably, however, this method is only used within a speed range from 0% to 30% or up to 70% whilst phase-shifted two-pulse fundamental frequency pulsing is used at higher speeds in order to keep harmonics and transitions as low as possible at the same time.

Naturally, gate-turn-off GTO thyristors or transistors can also be used as valves instead of the thyristors T1, T1', T2, T2' with ring-around circuits, not shown. Instead of the logic circuits 3.1 and 3.2 a computer can be provided which calculates the required switch-over points for the valves and outputs corresponding control signals. The auxiliary alternating voltages can be synchronous or asynchronous to the control voltages and exhibit sawtooth-shaped or trapezoidal or sinusoidal or sine-wave-like shape. If the shape of the auxiliary alternating voltages $U_{H1}$, $U_{H2}$ is changed, the characteristic of intersections is also changed, that is to say the valves are switched, for example, in dependence on the falling edge of $U_{H1}$ and $U_{H2}$, respectively.

Instead of initially switching all valve outputs to a positive potential, the outputs can also be switched to negative potential. It is of importance that the switching-over of the valves always occurs with the same dependency (except with a change in the sawtooth-shaped signals A1 and A2), that is to say always in dependence on a rising-voltage or a falling-voltage part of the auxiliary voltage. If it has been decided, for example, to use the rising-voltage edge of a sawtooth-shaped auxiliary voltage, there is no further switch-over at the falling edge. This overall reduces the number of inverter circuits by ⅓—and this without effects on the variation of the motor winding voltages with time. Instead of 6 transitions per period of the auxiliary control voltage, there are now only 4.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the U.S. is:

1. A method for controlling a three-phase inverter,
   (a) comprising at least one inverter section (5.1, 5.2, 24) per alternating-current phase (R, S, T) of the inverter,
   (b) in which valves (T1, T1,; T2, T2,) of the inverter section are controlled in dependence on intersections of two superimposition alternating-voltage signals ($U_{StR}$, $U_{StS}$, $U_{StT}$; $U_{H1}$, $U_{H2}$),
   (c) of which a sinusoidal first superimposition alternating-voltage signal ($U_{StR}$, $U_{StS}$, $U_{StT}$) has the required frequency and phase angle of the output voltage of the respective inverter section (5.1, 5.2; 24), and
   (d) a second superimposition alternating-voltage signal is at least a first variable-frequency and -amplitude auxiliary alternating-voltage signal ($U_{H1}$, $U_{H2}$), wherein
   (e) the valves of the inverter sections of two first and second inverter phases, the first superimposition alternating-voltage signal of which has been intersected, are switched only in the case of two first and second intersections of the superimposition alternating-voltage signals which follow one another in time, and
   (f) at a third intersection which follows in time, it is not the inverter of a third alternating-current phase, the first superimposition alternating-voltage signal of which has been intersected which is switched but the valves of the two inverter sections which belong to the two other alternating-current phases (R, S, T).

2. A method as claimed in claim 1, wherein
   (a) intersections with the same type of intersection characteristic, in which the intersecting auxiliary alternating-voltage signal ($U_{H1}$, $U_{H2}$) always exhibits a positive or always exhibits a negative voltage gradient are selected as intersections of the superimposition alternating-voltage signals,
   (b) in particular, it always exhibits a positive voltage gradient.

3. Method as claimed in claim 1, wherein the auxiliary alternating-voltage signals ($U_{H1}$, $U_{H2}$) for all three alternating-current phases (R, S, T) of the inverter (5.1, 5.2; 24) exhibit the same amplitude and the same phase angle.

4. A method as claimed in claim 1, wherein
   (a) the auxiliary alternating-voltage signal ($U_{H1}$, $U_{H2}$) is triangular,
   (b) in particular, it exhibits one at least approximately vertical edge.

5. A method as claimed in claim 1, wherein the frequency of the auxiliary alternating-voltage signal ($U_{H1}$, $U_{H2}$) is higher than the highest frequency of the output voltages ($U_{5.1R}$, $U_{5.2R}$) of the inverter section (5.1, 5.2; 24).

6. A method as claimed in claim 1, wherein all output voltages ($U_{5.1R}$ ... $U_{5.2T}$) of the inverter section of each alternating-current phase are controlled for the same voltage potential for initializing the control system.

7. A method as claimed in claim 6, wherein
   (a) at least at the beginning of the control process, the inverter valves (T1, T1'; T2, T2') are controlled for all alternating-current phases (R, S, T) in dependence on intersections of the first superimposition alternating-voltage signal ($U_{StR}$, $U_{StS}$, $U_{StT}$) with the at least one first auxiliary alternating voltage ($U_{H1}$, $U_{H2}$), but in dependence on a second intersection characteristic, which is different from the first one, of this first auxiliary alternating-voltage signal, in such a manner that a predeterminable first potential (+) is present at the alternating voltage output ($U_{5.1R}$, $U_{5.2R}$) of the inverter (5.1, 5.2), and
   (b) switching-over of the inverter valves is begun only when this first potential is present at all alternating-current phases.

8. A method as claimed in claim 1, comprising a converter arrangement, composed of two inverter sections (5.1, 5.2) per inverter current phase (R, S, T), for generating a single-phase alternating voltage ($U_R$), wherein alternating voltage signals which are phase-shifted by 180° electrical with respect to one another are used as auxiliary alternating-voltage signals ($U_{H1}$, $U_{H2}$) of the two inverter sections, the angle of 360° electrical referring to the duration of a period of these alternating-voltage signals and the first superimposition voltage signals ($U_{StR}$, $U_{StS}$, $U_{StT}$) corresponding to the output voltage of the inverter section having the same phases.

9. A method as claimed in claim 1, wherein at least one of the superimposition alternating-voltage signals ($U_{StR}$, $U_{StS}$, $U_{StT}$; $U_{H1}$, $U_{H2}$) and the intersections of these superimposition alternating-voltage signals are formed as time-dependent quantities of a timer of a computer.

10. A method as claimed in claim 1, wherein the shape of the auxiliary alternating-voltage signals ($U_{H1}$, $U_{H2}$) can be switched during the operation of the inverter (A1, A2).

* * * * *